United States Patent
Kim et al.

(10) Patent No.: US 10,969,653 B2
(45) Date of Patent: Apr. 6, 2021

(54) APERTURE STOP AND CAMERA MODULE INCLUDING THE SAME

(71) Applicant: SAMSUNG ELECTRO-MECHANICS CO., LTD., Suwon-si (KR)

(72) Inventors: Jae Kyung Kim, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/460,537

(22) Filed: Jul. 2, 2019

(65) Prior Publication Data

US 2020/0064711 A1 Feb. 27, 2020

(30) Foreign Application Priority Data

Aug. 22, 2018 (KR) .................. 10-2018-0098126

(51) Int. Cl.
*G03B 9/06* (2021.01)

(52) U.S. Cl.
CPC ...................... *G03B 9/06* (2013.01)

(58) Field of Classification Search
CPC ............... G03B 9/06; G03B 9/24; G03B 9/04
See application file for complete search history.

(56) References Cited

U.S. PATENT DOCUMENTS

| | | | | |
|---|---|---|---|---|
| 4,390,262 A * | 6/1983 | Hirohata | ................ | G03B 7/087 396/449 |
| 6,447,175 B1 * | 9/2002 | Ogawa | ................ | G03B 9/00 396/488 |
| 6,860,655 B2 * | 3/2005 | Miyawaki | ................ | G03B 9/04 396/451 |
| 7,338,222 B2 * | 3/2008 | Numnual | ................ | G03B 9/02 396/505 |
| 7,883,280 B2 * | 2/2011 | Viglione | ................ | G03B 9/08 396/463 |
| 10,571,648 B2 | 2/2020 | Lee | | |
| 2002/0186977 A1 | 12/2002 | Ogawa | | |
| 2006/0201894 A1 * | 9/2006 | Wood | ................ | B29C 45/14065 211/10 |
| 2007/0090698 A1 | 4/2007 | Yasuda | | |

(Continued)

FOREIGN PATENT DOCUMENTS

| | | |
|---|---|---|
| CN | 1953295 A | 4/2007 |
| CN | 10186596 A | 12/2007 |

(Continued)

OTHER PUBLICATIONS

Korean Office Action dated Nov. 18, 2019 in corresponding Korean Patent Application No. 10-2018-0098126 (8 pages in English, 6 pages in Korean).

(Continued)

*Primary Examiner* — Clayton E. LaBalle
*Assistant Examiner* — Leon W Rhodes, Jr.
(74) *Attorney, Agent, or Firm* — NSIP Law (57) ABSTRACT

An aperture stop includes a housing, a blades disposed in the housing and rotated to form an incident hole having variable sizes, and a driver to rotatably move the blades. Each of the blades includes a through hole and protrusions disposed on an internal surface of the through hole forming the incident hole.

19 Claims, 10 Drawing Sheets

(56) References Cited

U.S. PATENT DOCUMENTS

| | | | |
|---|---|---|---|
| 2008/0192326 A1 | 8/2008 | Mizumaki et al. | |
| 2009/0269048 A1 | 10/2009 | Suzuki | |
| 2010/0246183 A1* | 9/2010 | Jurik | G03B 9/06 |
| | | | 362/281 |
| 2012/0076486 A1 | 3/2012 | Bai et al. | |
| 2016/0178805 A1 | 6/2016 | Kang et al. | |
| 2017/0010441 A1* | 1/2017 | Kondo | G03B 13/36 |
| 2017/0324892 A1 | 11/2017 | Kim et al. | |
| 2018/0164537 A1* | 6/2018 | Lee | G03B 5/02 |

FOREIGN PATENT DOCUMENTS

| | | |
|---|---|---|
| CN | 101681083 A | 3/2010 |
| CN | 108181775 A | 6/2018 |
| JP | 3437117 B2 | 8/2003 |
| JP | 2017-198935 A | 11/2017 |
| KR | 10-2008-0074797 A | 8/2008 |
| KR | 10-2012-0032433 A | 4/2012 |
| KR | 10-1477247 B1 | 12/2014 |
| KR | 10-2016-0075085 A | 6/2016 |
| KR | 10-1700771 B1 | 1/2017 |

OTHER PUBLICATIONS

Chinese Office Action dated Jan. 21, 2021 in counterpart Chinese Patent Application No. 201910764447.9 (8 pages in English, 10 pages in Chinese).

* cited by examiner

APERTURE STOP AND CAMERA MODULE INCLUDING THE SAME

CROSS-REFERENCE TO RELATED APPLICATION

This application claims the benefit under 35 U.S.C. § 119(a) of Korean Patent Application No. 10-2018-0098126 filed on Aug. 22, 2018 in the Korean Intellectual Property Office, the entire disclosure of which is incorporated herein by reference for all purposes

BACKGROUND

1. Field

The following description relates to an aperture stop and a camera module including the same.

2. Description of Background

In general, products suffering from camera image deterioration caused by temperature variations or surrounding environments are mostly security cameras in closed-circuit television (CCVD) systems and the like. As a demand for automotive cameras has been increased and the applications of automotive cameras have been expanded, there is a need for a solution to image deterioration caused by a surrounding environment.

For example, state-of-the-art automobiles are equipped with rearview cameras, as well as various other cameras, mounted on the entire body including a rearview mirror and front and rear automobile bodies, such as surround view monitoring (SVM) cameras, and the like, for an advanced driver assistance system (ADAS). In the future, it is expected that many cameras having various functions will be mounted on automobiles.

In addition, as demand and need for autonomous driving increases, the importance of stable image acquisition through automotive ADAS cameras is growing.

Light emitting diode (LEDs) are used in traffic signs, traffic lights, and various types of lighting. As most LEDs for lighting and signals use a pulse width modulation (PWM) control method, they may individually have a blinking period according to respective LED lightings. For this reason, LED blinking occurs in images input to a camera. A method of preventing LED blinking is known as LED flicker mitigation (LFM).

A blinking period of LED lighting depends on various light sources, and exposure time of a camera should be applied over a blinking period of an LED to implement LFM. Due to such characteristics, some or all images may be saturated in a daytime environment in clear weather, and such saturated images may decrease in dynamic range.

To perform LFM in the case in which an aperture stop has a relatively small diameter, a camera is exposed for a time longer than a blinking period of an LED to have at least one LED "ON" period. Meanwhile, in the case in which an aperture stop has a relatively large diameter, it is difficult to implement the LFM when an exposure time is decreased, such that saturation of images is prevented to compensate for a dynamic range.

Accordingly, there is a need for a camera with an apparatus for appropriately adjusting an exposure time and exposure amount.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an aperture stop includes a housing, blades disposed in the housing and rotated to form an incident hole having variable sizes, and a driver to rotatably move the blades. Each of the blades include a through hole and protrusions disposed on an internal surface of the through hole forming the incident hole.

Each of the blades may include a blocking portion on a top surface or a bottom surface in an optical axis direction.

The protrusions may be formed by a corrosion treatment of the blades.

Each blocking portion may include at least one of a carbon-based material, a chromium-based oxide, a copper-based oxide, a manganese-based oxide, a cobalt-based oxide, a sulfide, and a nickel-based oxide.

The aperture stop may include a blocking spacer disposed on an image side of the housing.

The driver may include a driving ring to be rotated such that the blades are rotated about rotation axes of the blades, respectively; and a magnet and a coil disposed on at least one portion of the driving ring in a circumferential direction.

The magnet may be fixedly disposed with the driving ring, and the coil may be disposed in the housing to face the magnet.

The coil may be fixedly disposed with the driving ring, and the magnet may be disposed in the housing to face the coil.

The driving ring may include a stopper configured to limit rotation of the blades.

The housing may include a ring-shaped yoke in a portion of the housing corresponding to the magnet in the optical axis direction, and the yoke may include diameter expanding portions in the circumferential direction to vary in thickness in a radial direction.

The blades may be driven in a multistage manner, in which the blades are rotatably moved to form N incident holes having different sizes by mutual combinations of the blades, where N is a positive integer.

The magnet may be fixed to the driving ring by insert injection.

The aperture stop may include position sensors disposed on both sides of the coil.

The aperture stop may include a ball bearing disposed between the driving ring and a surface of the housing.

The blades may close the incident hole when rotated most inwardly.

In another general aspect, a camera module includes a lens barrel accommodating lenses sequentially stacked in an optical axis direction and an aperture stop disposed between the lenses and aligned with the lenses.

The driving ring may include driving shafts to be inserted into driving shaft holes of the blades to rotate the blades.

The driving shaft holes may be inclined to a rotational direction of the driving ring and a size of the incident hole may vary based on a position of the driving shafts within the driving shaft holes.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described with reference to the attached drawings.

A camera module according to an example may be mounted on automobiles and buildings as well as portable electronic devices such as mobile communications terminals, smartphones, tablet PCs, and the like.

Figure 1:
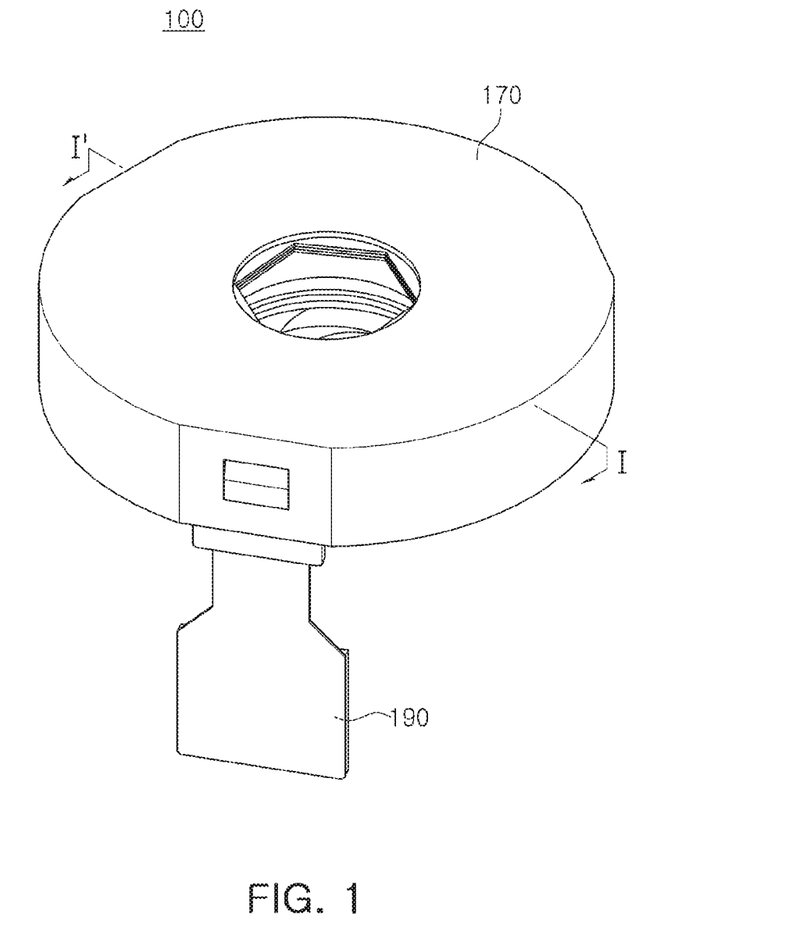
FIG. 1 is a perspective view of an aperture stop according to an example.
Figure 2:
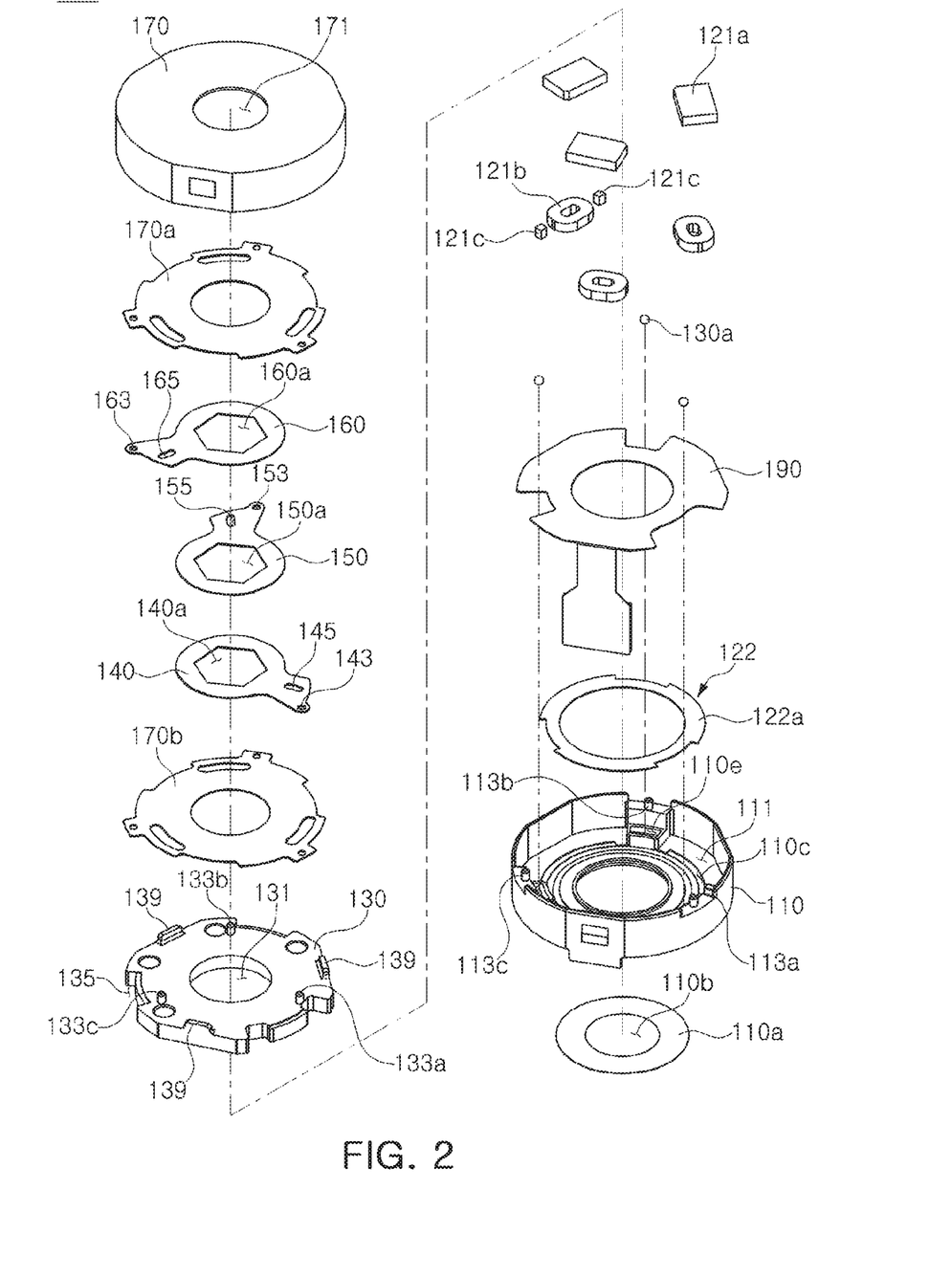
FIG. 2 is an exploded perspective view of an aperture stop according to an example.
Figure 3:
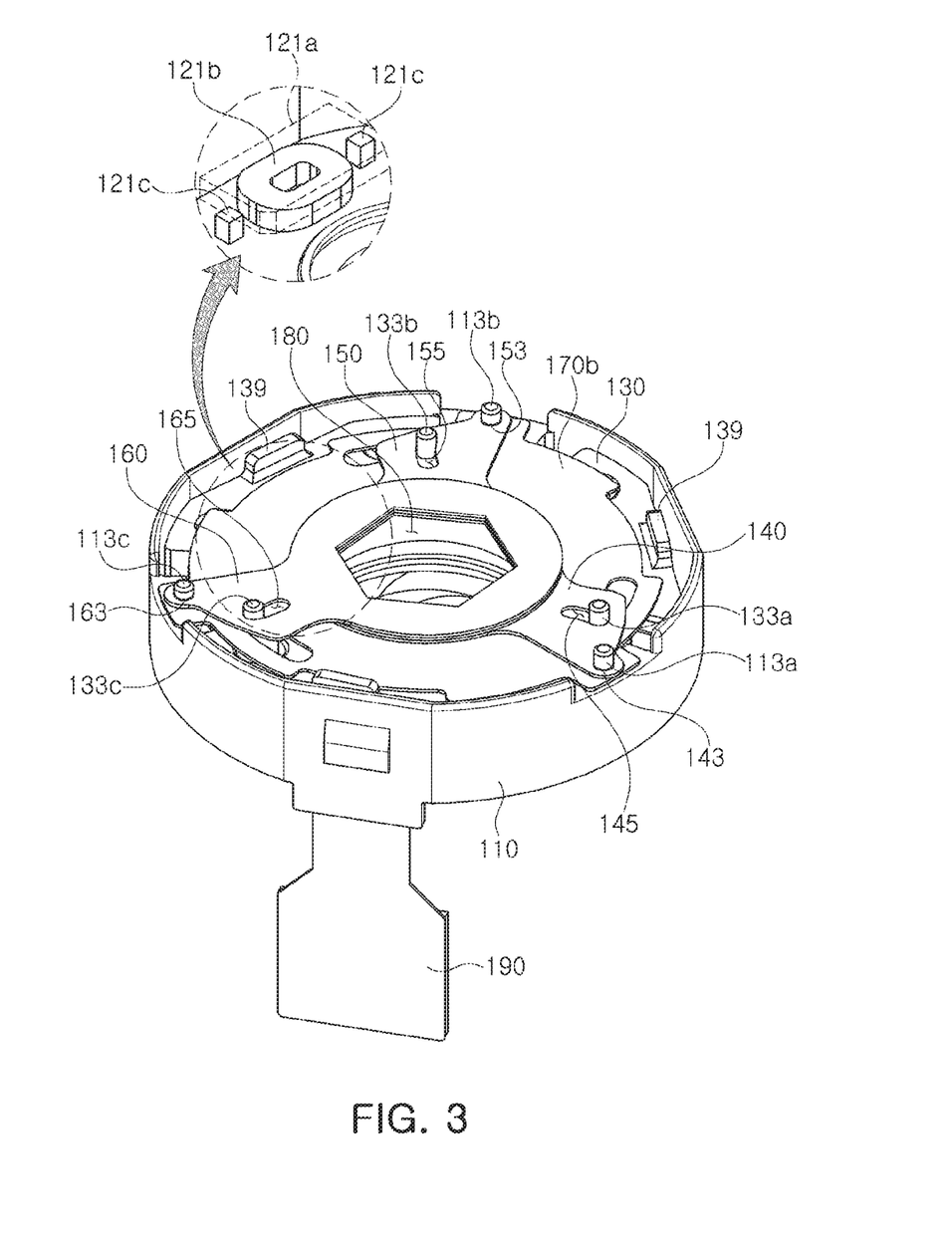
FIG. 3 is a perspective view of the aperture stop of FIG. 1 without a cover.
Figure 4A:
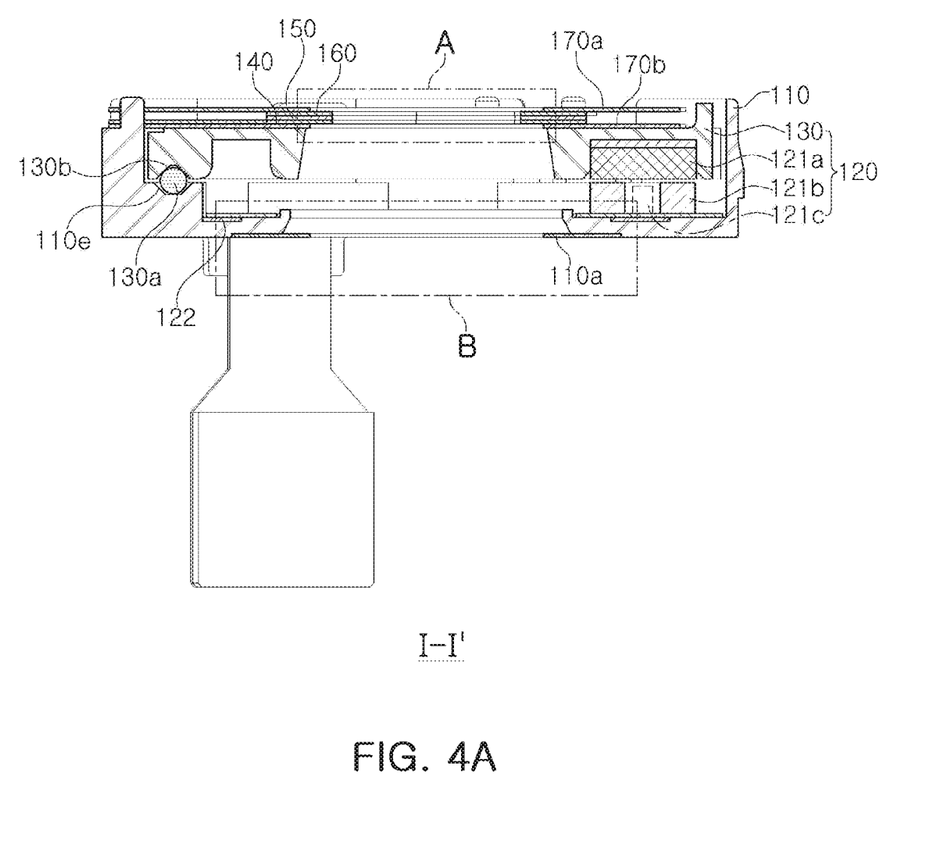
FIG. 4A is a cross-sectional view taken along line I-I in FIG. 1.
Figure 4B:
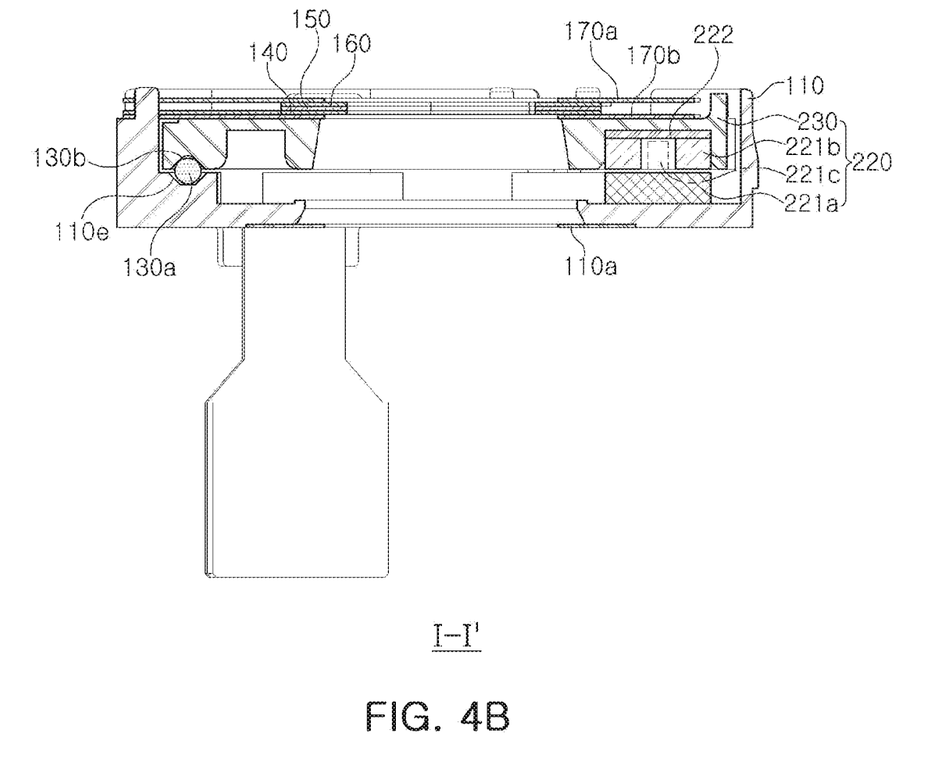
FIG. 4B is a modified version of the cross-sectional view taken along line I-I in FIG. 1 and a cross-sectional view of an aperture stop according to another example.
Figure 5:
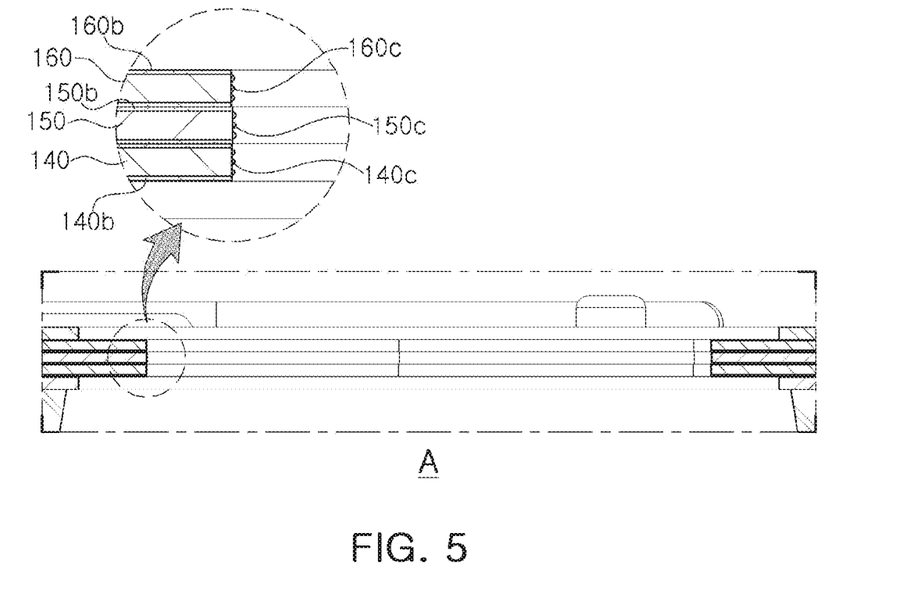
FIG. 5 is an enlarged view of portion A in FIG. 4.
Figure 6:
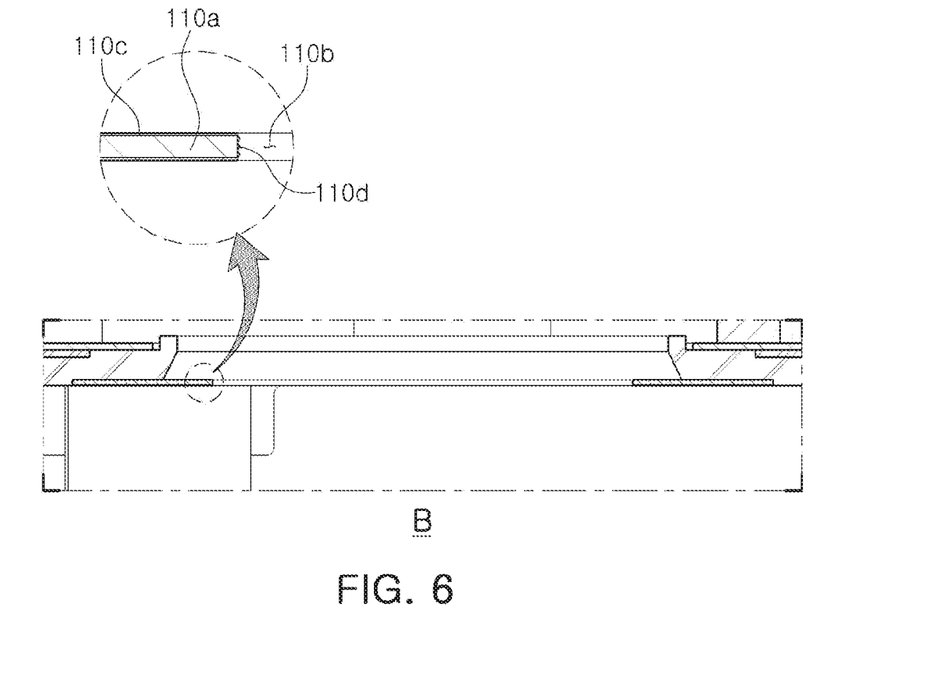
FIG. 6 is an enlarged view of portion B in FIG. 4.

FIG. 1 is a perspective view of an aperture stop according to an example, FIG. 2 is an exploded perspective view of an aperture stop according to an example, FIG. 3 is a perspective view of the aperture stop of FIG. 1 without a cover, FIG. 4A is a cross-sectional view taken along line I-I in FIG. 1, FIG. 4B is a modified version of the cross-sectional view taken along line I-I in FIG. 1 and a cross-sectional view of an aperture stop according to another example, FIG. 5 is an enlarged view of portion A in FIG. 4, and FIG. 6 is an enlarged view of portion B in FIG. 4.

Referring to FIGS. 1 to 6, an aperture stop 100 according to an example is an apparatus configured to selectively change the amount of light incident on a camera module. As an example, the aperture stop 100 may implement incident holes having different sizes in a multistage manner or a successive manner due to a plurality of blades. Accordingly, light may be incident through one of the incident holes having various sizes, implemented by the aperture stop 100, depending on an image capturing environment.

The aperture stop 100 includes a housing 110 and a plurality of blades (first blade 140, second blade 150, and third blade 160), and an aperture stop driver (including a driving ring 130 including a driving magnet 121a and a driving coil 121b). The aperture stop 100 may further include a cover 170 covering the blades 140, 150, and 160 and a through-hole 171 through which light is incident.

Spacers 170a and 170b may be provided on both surfaces of the plurality of blades 140, 150 and 160 between the cover 170 and the driving ring 130. The spacers 170a and 170b may allow distances between the blades 140, 150 and 160 and the cover 170, and the driving ring 130 to be maintained.

The aperture stop 100 according to the present example includes the blades 140, 150, and 160, and may include, for example, three or more blades. Hereinafter, a case in which three blades are provided will be described as an example for ease of description, but the configuration of the aperture stop is not limited to three blades.

The first to third blades 140, 150, and 160 overlap each other to form an incident hole 180. As illustrated in the drawings, the first to third blades 140, 150, and 160 may have a structure having individual through-holes 140a, 150a, and 160a, respectively, or may be provided in the form of a boomerang in such a manner that concave portions of the first to third blades 140, 150, and 160 may be disposed in a round shape to be directed toward an optical axis, and thus, an incident hole 180 having a generally round or polygonal shape may be formed.

The blades 140, 150, and 160 may be respectively provided with protruding portions 140c, 150c, and 160c having a plurality of protrusions on a surface disposed parallel to an optical axis direction of an internal end portion in which the incidence hole 180 is formed. For example, the first to third blades 140, 150, and 160 according to the present example are provided with a plurality of protrusions formed by performing a corrosion treatment on an internal end surface forming the through-holes 140a, 150a, and 160a. Thus, protrusions 140c, 150c, and 160c may be prepared. Flaring may be reduced by the protrusions 140c, 150c, and 160c provided on a surface disposed parallel to an optical axis direction of internal end portions of the blades 140, 150, and 160.

Light is incident through the incident hole 180 of the aperture stop 100. The incident light may be reflected on the internal end surfaces of the first to third blades 140, 150, and 160, disposed parallel to the optical axis direction, to cause flaring. Accordingly, to significantly reduce the flaring, the protrusions 140c, 150c, and 160c are provided on the surface of the internal end surfaces of the first to third blades 140, 150, and 160, disposed parallel to the optical axis direction. Thus, light reflection may be significantly reduced to reduce the flaring.

The blades 140, 150, and 160 may be respectively provided with blocking portions 140b, 150b, and 160b on a top or bottom surface in the optical axis direction. The blocking portions 140b, 150b, and 160b may be formed to cover (coat) at least one of the top and bottom surfaces of the blades 140, 150, and 160. The blocking portions 140b, 150b, and 160b may be coated with a material, which does not reflect incident light, for example, a light-absorbing material, to significantly reduce flaring. The blocking portions 140b, 150b, and 160b may be formed of at least one of a carbon-based material, a chromium-based oxide, a copper-based oxide, a manganese-based oxide, a cobalt-based oxide, a sulfide, and a nickel-based oxide.

Furthermore, the aperture stop 100 according to the present example may be provided with a blocking spacer 110a disposed on an image side surface of a bottom surface of a housing 110 to prevent flaring from occurring. The blocking spacer 110a has a through-hole 110b through which light passes. At least one of the top and bottom surfaces of the blocking spacer 110a in the optical axis direction may be provided with a blocking portion 110c. The blocking portion 110c may be provided to cover (coat) at least one of the top and the bottom surfaces of the blocking spacer 110a in the optical axis direction. The blocking portion 110c may be coated with a material which does not reflect incident light, for example, a light-absorbing material, to significantly reduce flaring. The blocking portion 110c may be formed of at least one of a carbon-based material, a chromium-based oxide, a copper-based oxide, a manganese-based oxide, a cobalt-based oxide, a sulfide, and a nickel-based oxide.

The blocking spacer 110a may be provided with a protruding portion 110d including a plurality of protrusions on a surface disposed parallel to an optical axis direction of an internal end portion forming the through-hole 110b. For example, the blocking spacer 110a according to the present example may also be provided with a plurality of protrusions formed by performing a corrosion treatment on an internal end surface forming the through-hole 110b. Thus, the protruding portion 110d may be provided. The flaring may be reduced by the protruding portion 110d provided on the surface disposed parallel to the optical axis direction of the internal end portion of the blocking spacer 110a.

Light is incident through the incident hole 180 of the aperture stop 100. The incident light may be reflected on the internal end surface of the blocking spacer 110a, a surface disposed parallel to the optical axis direction, to cause flaring. Accordingly, to significantly reduce the flaring, the protruding portion 110d may be provided on a surface of the internal end surface of the blocking spacer 110a disposed parallel to the optical axis direction. Thus, light reflection may be significantly reduced to reduce the flaring.

In the present example, the through-holes 140a, 150b, and 160b of the first to third blades 140, 150, and 160 may have a hexagonal shape. When the first to third blades 140, 150, and 160 have a boomerang shape, internal concave portions may be disposed to form portions of the hexagonal shape, respectively, in such a manner that the first to third blades 140, 150, and 160 partially overlap each other to form a hexagonal incidence hole. However, an internal side of the blade forming the incident hole may be concave or straight without being angled.

Since the first to third blades 140, 150, and 160 are slidably moved while portions thereof are in contact with each other, the first to third blades 140, 150 and 160 may be subjected to an antistatic treatment to prevent the generation of static electricity.

The first to third blades 140, 150, and 160 are driven in conjunction with the driving ring 130.

The driving ring 130 constitutes a driver. The driving ring 130 rotates about the optical axis due to an interaction between the driving magnet 121a provided in the driving ring 130 and the driving coil 121b provided in the housing 110.

The driving ring 130 may be provided in the form of a circular ring to facilitate rotation, and the housing 110 may be provided with a guide (guide groove) 111 to facilitate rotation of the driving ring 130. A bearing 130a (for example, a ball bearing 130a) may be provided between the driving ring 130 and a bottom of the housing 110 to facilitate the rotation of the driving ring 130. Guide grooves 130b and 110e, in which the ball bearing 130a is inserted into the driving ring 130 or the housing 110, may be provided in a surface on which the driving ring 130 and the housing 110 are opposed to each other.

A through-hole 131 is formed in the center of the driving ring 130, allowing light to pass therethrough. The through-hole 131 may have a size equal to or larger than a size of a maximum-sized incident hole 180 formed by the first to third blades 140, 150, and 160. The driving ring 130 may be subjected to an antistatic treatment to prevent the generation of static electricity.

The housing 110 may be provided with the guide groove 111 to guide rotational motion of the driving ring 130. The driving ring 130 may be inserted into the guide groove 111 to rotate while being guided. The driving ring 130 is provided with a rounded edge (a predetermined groove shape (an avoiding groove) 135 or the like is provided on the edge of the driving ring 130 to avoid interference with fixed shafts 113a, 113b, and 113c which are adjacent members). The guide groove 111 may be formed to have a rounded shape corresponding to the driving ring 130. The guide groove 111 may slightly lead inwardly of the edge to provide the fixed shafts 113a, 113b, and 113c, or the like.

Even when the guide groove 111 is not provided, driving shafts 133a, 133b, and 133c of the driving ring 130 are inserted into the blades 140, 150 and 160, respectively, to naturally induce rotation.

The first to third blades 140, 150, and 160 are driven in conjunction with the rotating driving ring 130.

The first to third blades 140, 150, and 160 have rotational shaft holes 143, 153, and 163 and driving shaft holes 145, 155 and 165, respectively. The fixed shafts 113a, 113b and 113c provided in the housing 110 are rotatably inserted into the rotational shaft holes 143, 153, and 163, respectively. The driving shafts 133a, 133b, 133c are rotatably and movably inserted into the driving shaft holes 145, 155, and 165, respectively.

Hereinafter, the rotational shaft holes 143, 153, and 163 and the driving holes 145, 155, and 165, provided in such a manner that protrusion-shaped fixed shafts 113a, 113b, and 113c are inserted thereinto to transfer force or form a rotational shaft, will be referred to in designations thereof as including a 'hole' for convenience of description, but may be provided in the form of grooves.

The rotational shaft holes 143, 153, and 163 of the first to third blades 140, 150, and 160 are provided in a circular form and may only be rotated while the fixed shafts 113a, 113b and 113c are inserted into the rotational shaft holes 143, 153, and 163. The driving shift holes 145, 155, and 165 are elongated in one direction in such a manner that the driving shafts 133a, 133b, and 133c may be moved while being inserted into driving shift holes 145, 155, and 165. The driving shaft holes 145, 155, and 165 may be inclined to a rotational direction of the driving ring 130.

Accordingly, the driving shafts 133a, 133b, and 133c rotate depending on the rotation of the driving ring 130, and the first to third blades 140, 150, and 160 may be rotated to shrink inwardly or extend outwardly while the driving shafts 133a, 133b, and 133c inserted into the driving shaft holes 145, 155, and 165 of the first to third blades 140, 150, and 160 are moved. Thus, incident holes 180 having various sizes may be implemented in a multistage manner or a successive manner.

Since the first to third blades 140, 150, and 160 rotate about the driving shafts 133a, 133b, and 133c, the housing 110 or the driving ring 130 may be provided with a stopper 139 to limit a rotation angle and prevent damage or the like caused by a contact between another component and the first to third blades 140, 150, and 160. Referring to FIG. 7C, a disposition in which the first to third blades 140, 150, and 160 are brought into contact with the stopper 193 to stop rotations thereof may be shown in a disposition in which they are rotated to close the incident hole 180.

The fixed shafts 113a, 113b, and 113c of the housing 110 are provided to correspond to the number of the blades 140, 150 and 160. When the fixing shafts 113a, 113b, and 113c are sequentially connected, they may be disposed to form a regular polygon. When three blades are provided, the fixed shafts 113a, 113b, and 113c may be sequentially connected to form a regular triangle.

For example, the first to third blades 140, 150, and 160 may be circularly disposed in a circumferential direction to form an incident hole. While the first to third blades 140, 150, and 160 are rotated to shrink inwardly or extend outwardly, incidence holes 180 having various sizes may be implemented in a multistage manner or a successive manner.

Depending on the shape of the through-holes 140a, 150a, and 160a formed in the first to third blades 140, 150, and 160, the incident hole 180 may have a shape in which a circular arc is repeatedly formed in the circumferential direction (when the through-holes 140a, 150a, and 160a are in the form of a circle or an arc of the circle) or may have a polygonal shape (when the through-holes 140a, 150a, and 160a are in the form of a polygon). In the case in which an incident hole has a polygonal shape, all incident holes 180 may be implemented in the form of a polygon (for example, a hexagon, a dodecagon, or the like) irrespective of sizes thereof.

Accordingly, light can be incident through one of the incidence holes having various sizes depending on capturing environment.

Referring to FIG. 4A, an aperture stop driver 120 includes the driving ring 130, and includes at least one driving magnet 121a, disposed at the driving ring 130 in a circumferential direction to rotate the driving ring 130, and a driving coil 121b provided in a housing 110 to face the driving magnet 121a. The driving coil 121b is provided on a board 190, and the board 190 is fixed to the housing 110. The board 190 may be a flexible printed circuit board (FPCB). In FIG. 2, three driving magnets 121a and three driving coils 121b are provided. However, the number of the driving magnets 121a and the number of the driving coils 121b are not limited thereto, and one or more driving magnets 121a and one or more driving coils 121b may be provided.

The driving ring 130 may be provided with a seating groove or a seating hole to which the driving magnet 121a is fixed. The driving magnet 121a can be molded into the driving ring 130 by insert injection.

As illustrated in 4B, an aperture stop driver 220 according to another example includes a driving ring 230, and includes at least one driving coil 221b, disposed at the driving ring 230 in a circumferential direction to rotate the driving ring 230, and a driving magnet 221a in a housing 110 to face the driving coil 221b. The driving ring 230 may be provided with a yoke 222 on a rear surface of the driving coil 221b and a pair of position sensors 221c provided on both sides of the driving coil 221b. In the example illustrated in FIG. 4B, the driving coil 221b may be provided on the driving ring 230, which is a rotating member.

A size of an incidence hole 180 of an aperture stop may be changed in a multistage manner or a successive manner. Therefore, the degree of rotation of the driving ring 130 needs to be accurately sensed to accurately implement realize the size of the incidence hole. Accordingly, in the present example, a position sensor 121c disposed to face the driving magnet 121a fixedly mounted on the driving ring 130 may be provided to determine a position of the driving magnet 121a.

The position sensor 121c may be a hole sensor, and a pair of position sensors may be provided, such that a position sensor 121c is provided on both sides of the driving coil 121b fixed to the housing 110. For example, as illustrated in an internal perspective view of a portion separately indicated by an arrow in FIG. 3, a pair of position sensors 121c may be provided, with one position sensor 121c of the pair being on both sides of the driving coil 121b.

In the case of a mobile device, since a driving magnet has a small size, there is no problem in position sensing even when only one position sensor is used. However, in the case of an automobile or the like, since a driving magnet and a driving coil have relatively large sizes, a pair of hole sensors 121c may be provided with each driving coil 121b to achieve accurate position sensing.

Only one position sensor 121c may be provided according to a designer's intention. In this case, the position sensor 121c may be provided on either one side of the driving coil 121b or inside a wound driving coil 121b.

The position sensor 121c may be provided together with the board 190 provided with the driving coil 121b.

When the driving ring 130 is rotated, a closed loop control method may be used to sense and feed back a position of the driving magnet 121a. Accordingly, the position sensor 121c is required for closed loop control. The board 190 may be provided with a driver IC (not illustrated) to provide a driving signal to the driving coil 121b.

When power is applied to the driving coil 121b, the driving ring 130 may rotate about an optical axis in a circumferential direction by an electromagnetic influence between the driving magnet 121a and the driving coil 121b. Accordingly, the size of the incident hole 180 may be changed in a multistage manner or a successive manner while first to third blades 140, 150 and 160 linked to the driving ring 130 rotate around the fixed shafts 113a, 113b and 113c.

In the present example, the size of the incidence hole 180 of the aperture stop may be variously changed to N (N being a positive integer) in multiple stages, and a yoke 122 disposed to face the driving magnet 121a may be provided in such a manner that the first to third blades 140, 150, and 160 are disposed in accurate positions to accurately implement the size of the incident hole 180. The yoke 122 may be provided in a ring shape, successive in the circumferential direction, or a plurality of the yokes 122 may be spaced apart at regular intervals in the circumferential direction.

The yoke 122 may magnetically react with the driving magnet 121a to fix the driving ring 130 at a predetermined position.

When the yoke 122 is provided in the form of a circular ring, the yoke 122 may be provided with a diameter expanding portion 122a in such a manner that attractive force with the driving magnet 121a is relatively greater than attractive force of other portions. For example, the yoke 122 may be repeatedly provided in a radial direction to vary in thickness in the circumferential direction. In this structure, a portion having a larger thickness in the circumferential direction may be the diameter expanding portion 122a. Since a portion having relatively high attractive force, acting between the driving magnet 121a and the yoke 122 is formed when the driving coil 121b is not supplied with power due to the diameter expanding portion 122a, the driving ring 130 may be fixed at the portion. Accordingly, the first to third blades 140, 150, and 160 linked to the driving ring 130 may stop while implementing an incidence hole having a predetermined size.

The yoke 122 may be fixed to a bottom surface of the housing 110. The yoke 122 may be fixed to the bottom of the housing 110 by bonding using an adhesive and the housing may be provided with a seating groove in which the yoke 122 is seated. The yoke 122 may be molded on the bottom surface of the housing 110 by insert injection molding to be disposed on the bottom surface of the housing 110 when the housing 110 is manufactured.

Figure 7A:
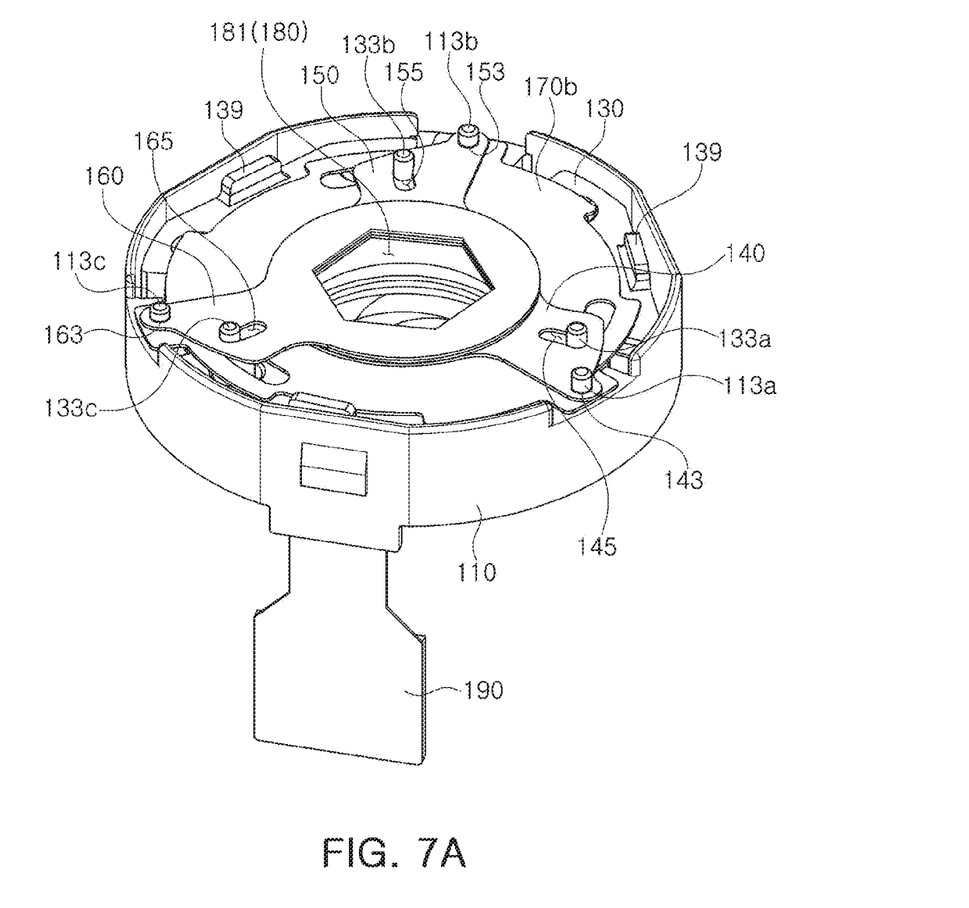
FIGS. 7A, 7B, and 7C are reference diagrams illustrating driving of an aperture stop according to an example.
Figure 7B:
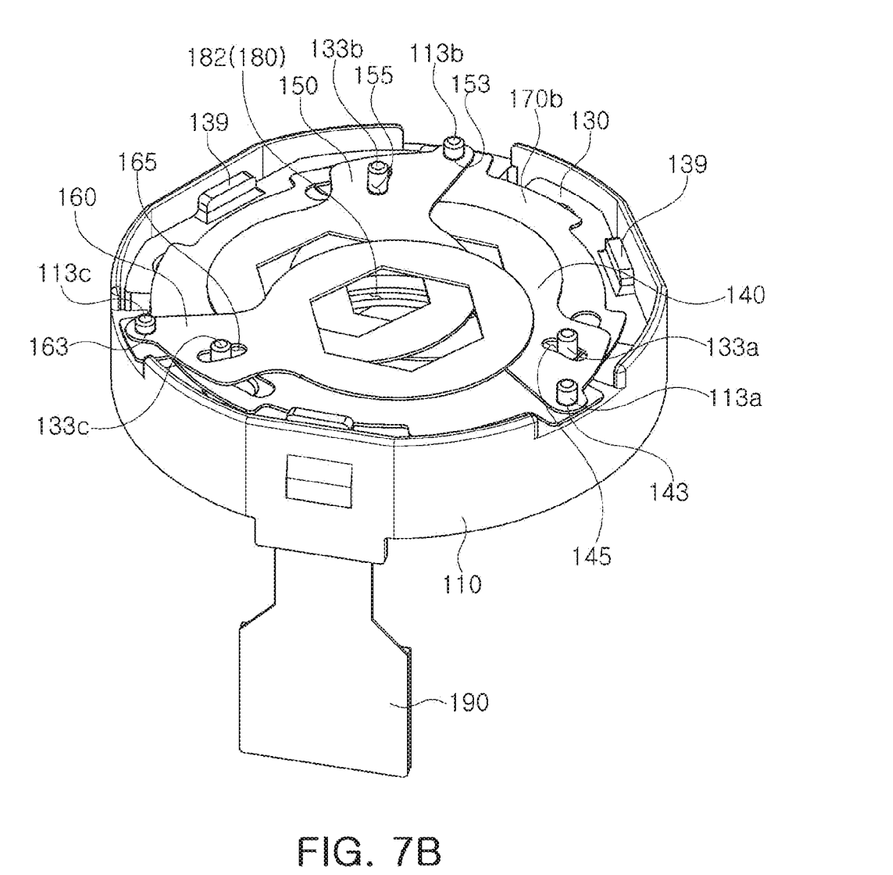
Figure 7C:
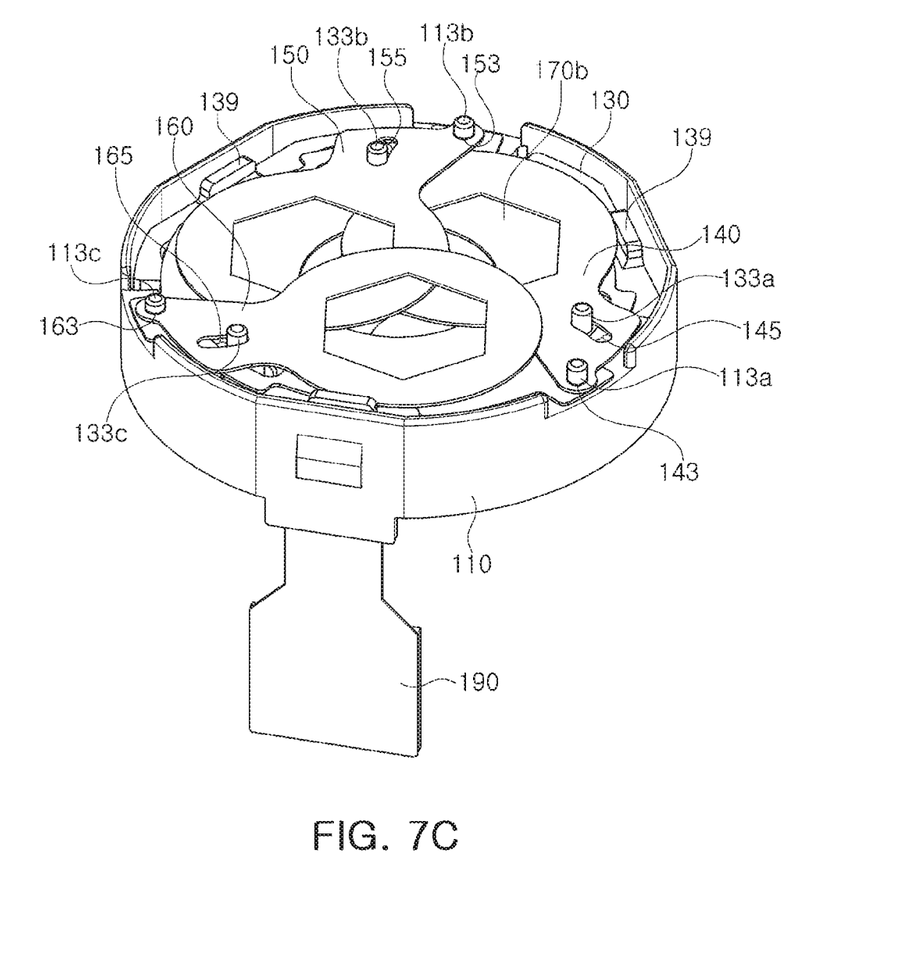

FIGS. 7A to 7C illustrate that an aperture stop is driven while an incident hole varies in a multistage manner or a successive manner (an aperture stop 100 according to an example is representatively illustrated).

As illustrated in FIG. 7A, when the driving shafts 133a, 133b, and 133c of the driving ring 130 are disposed at one side end portions of the driving shaft holes 145, 155, and 165 of the first to third blades 140, 150, and 160, respectively, an incidence hole 181 having a largest size may be implemented by the first to third blades 140, 150, and 160.

As illustrated in FIG. 7B, when the driving shafts 133a, 133b, and 133c move from one ends of the driving shaft holes 145, 155, and 165 to the other ends thereof, an incident hole 182 having a small size may be formed by the first to third blades 140, 150, and 160.

As illustrated in FIG. 7C, when the driving shafts 133a, 133b, and 133c move from one ends of the driving shaft holes 145, 155, and 165 to the other ends thereof, an incidence hole may be closed by first to third blades 140, 150, and 160.

Referring to FIGS. 7A to 7C, as the driving shafts 133a, 133b and 133c of the driving ring 130 move from one side end portion to the other side end portions thereof, incident holes are gradually decreased in size or are closed from the incident hole having the large size by the first to third blades 140, 150, and 160 in the incident hole, which may be implemented in the multistage manner or a successive manner. Conversely, as the driving shafts 133a, 133b, and 133c of the driving ring 130 move from the other end portions to one end portions of the driving shaft holes 145, 155, and 165 of the first to third blades 140, 150, and 160, incidence holes may be gradually increased in size while being closed by the first to third blades 140, 150, and 160 or may be implemented in a multistage manner or a successive manner until they all enter an open state.

Figure 8:
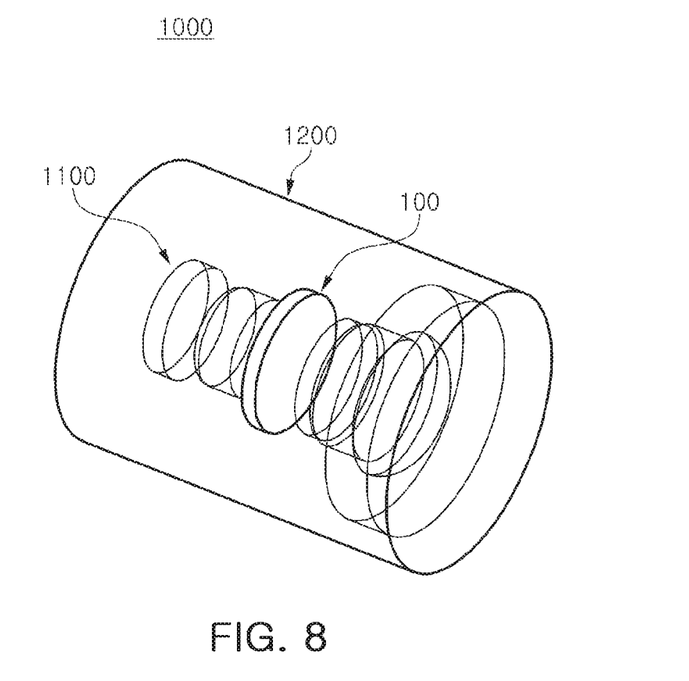
FIG. 8 illustrates an example of a camera module on which an aperture stop according to an example is mounted.

FIG. 8 illustrates an example of a camera module on which an aperture stop according to an example is mounted.

As illustrated in FIG. 8, a camera module 1000 according to an example may include a lens barrel 1200 including a plurality of lenses 1100 aligned in an optical axis direction. In addition, the camera module 1000 may include an aperture stop 100 according to the present examples included in the lens barrel 1200 to be aligned with the plurality of lenses 1100.

FIG. 8 illustrates a structure in which the aperture stop 100 is disposed on the lens barrel 1200 to be disposed between the plurality of lenses 1100. However, a structure of the aperture stop 100 is not limited thereto, and the aperture stop 100 may be provided between the plurality of lenses 1100 or on an external side of one of both side lenses constituting the plurality of lenses 1100.

Figure 9:
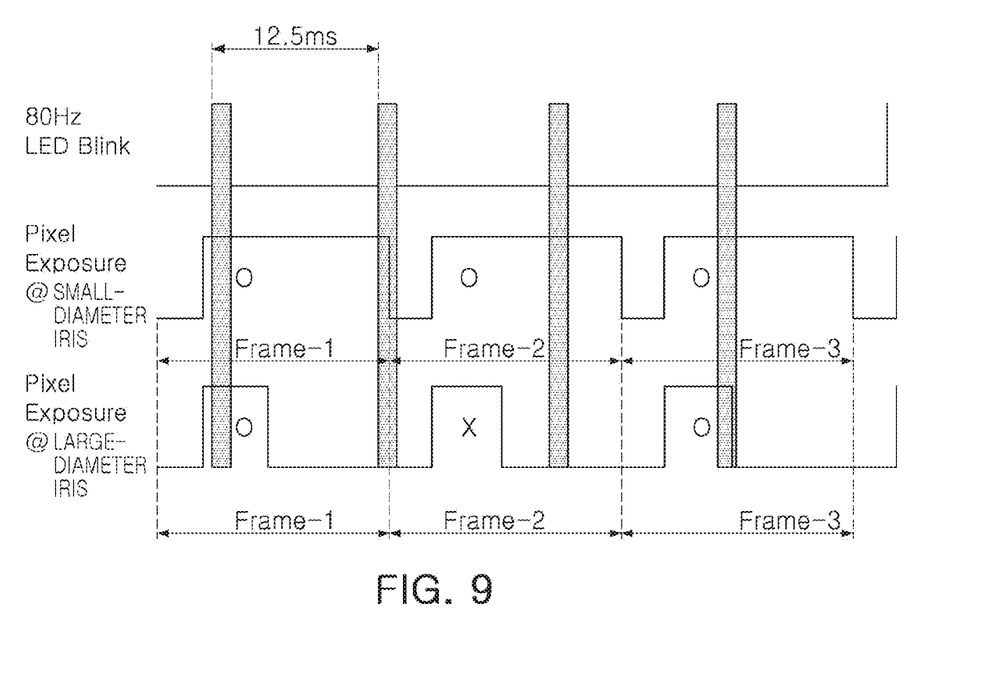
FIG. 9 is a reference diagram of a camera module according to an example associated with degradation of a camera.

FIG. 9 is a reference diagram of a camera module according to an example associated with degradation of a camera.

As illustrated in FIG. 9, when exposure time is reduced in such a manner that saturation of images may be prevented to compensate for a dynamic range like a large-diameter aperture stop, it may be difficult to implement LED flicker mitigation (LFM).

Accordingly, in the present disclosure, a variable iris is applied to the camera module as illustrated in FIG. 9. In an environment of a high intensity of light, a small-diameter iris is applied to reduce the intensity of incident light, and thus, the exposure time may be rendered longer than an LED blinking period to secure LFM performance or prevent saturation of images even when a predetermined level of exposure time is secured. In a low luminance environment, the intensity of light may be increased by a large-diameter to implement LFM and wide dynamic range (WDR) regardless of surrounding environment. Additionally, a predetermined level of brightness may be secured even in the low luminance environment.

Accordingly, when the aperture stop 100 according to one of the present examples is provided, an illuminance signal corresponding to an external environment may be received and an incident hole having a size corresponding to the illuminance may be implemented by the movement of blades. As a result, performance of the camera module 1000 may be further improved and deterioration of captured video or image may be reduced.

As described above, a means for adjusting exposure time of a camera is provided to prevent deterioration of the camera. Thus, deterioration of captured images of an automotive camera may be reduced.

Moreover, flaring may be prevented from occurring at an aperture stop. Thus, deterioration of captured images of a camera may be further reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects of the present disclosure in each example are to be considered as being applicable to similar features or aspects of the present disclosure in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An aperture stop, comprising:
a housing;
blades disposed in the housing and configured to rotate to form an incident hole having variable sizes; and
a driver configured to rotatably move the blades;
wherein the driver comprises:
a driving ring;
a coil disposed on at least a portion of the driving ring; and
position sensors disposed on both sides of the coil,
wherein each of the blades comprises a through hole and protrusions disposed on an internal surface of the through hole forming the incident hole.

2. The aperture stop of claim 1, wherein each of the blades comprises a blocking portion on a top surface or a bottom surface in an optical axis direction.

3. The aperture stop of claim 1, wherein the protrusions are formed by a corrosion treatment of the blades.

4. The aperture stop of claim 2, wherein each blocking portion comprises at least one of a carbon-based material, a chromium-based oxide, a copper-based oxide, a manganese-based oxide, a cobalt-based oxide, a sulfide, and a nickel-based oxide.

5. The aperture stop of claim 1, further comprising a blocking spacer disposed on an image side of the housing.

6. The aperture stop of claim 1, wherein:
the driving ring is configured to be rotated such that the blades are rotated about rotation axes of the blades, respectively; and
a magnet and the coil are disposed on at least one portion of the driving ring in a circumferential direction.

7. The aperture stop of claim 6, wherein the magnet is fixedly disposed with the driving ring, and
the coil is disposed in the housing to face the magnet.

8. The aperture stop of claim 7, wherein the housing comprises a ring-shaped yoke in a portion of the housing corresponding to the magnet in the optical axis direction, and
the yoke comprises diameter expanding portions in the circumferential direction to vary in thickness in a radial direction.

9. The aperture stop of claim 7, wherein the magnet is fixed to the driving ring by insert injection.

10. The aperture stop of claim 6, wherein the coil is fixedly disposed with the driving ring, and
the magnet is disposed in the housing to face the coil.

11. The aperture stop of claim 6, wherein the driving ring comprises a stopper configured to limit rotation of the blades.

12. The aperture stop of claim 6, further comprising a ball bearing disposed between the driving ring and a surface of the housing.

13. The aperture stop of claim 6, wherein the driving ring comprises driving shafts configured to be inserted into driving shaft holes of the blades to rotate the blades.

14. The aperture stop of claim 13, wherein the driving shaft holes are inclined to a rotational direction of the driving ring and a size of the incident hole varies based on a position of the driving shafts within the driving shaft holes.

15. The aperture stop of claim 1, wherein the blades are driven in a multistage manner, in which the blades are rotatably moved to form N incident holes having different sizes by mutual combinations of the blades, where N is a positive integer.

16. The aperture stop of claim 1, wherein the blades are configured to close the incident hole when rotated most inwardly.

17. A camera module comprising:
a lens barrel accommodating lenses sequentially stacked in an optical axis direction; and
an aperture stop, according to claim 1, disposed between the lenses and aligned with the lenses.

18. An aperture stop comprising:
a housing;

blades disposed in the housing and configured to rotate to form an incident hole having variable sizes; and
a driver configured to rotatably move the blades,
wherein the driver comprises:
   a driving ring,
   a magnet and a coil disposed on at least one portion of the driving ring; and
   position sensors disposed on both sides of the coil.

19. An aperture stop comprising:
a housing;
blades disposed in the housing and configured to rotate to form an incident hole having variable sizes; and
a driver configured to rotatably move the blades,
   wherein the driver comprises:
     a driving ring configured to be rotated such that the blades are rotated about rotation axes of the blades, respectively; and
     a magnet disposed on at least one portion of the driving ring in a circumferential direction,
wherein position sensors are disposed to face both sides of the magnet.

* * * * *